(12) United States Patent
Schmidt

(10) Patent No.: US 7,677,154 B2
(45) Date of Patent: Mar. 16, 2010

(54) CONTROL UNIT FOR ROTOR BLADE ADJUSTMENT

(75) Inventor: Stefan Schmidt, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 11/682,432

(22) Filed: Mar. 6, 2007

(65) Prior Publication Data

US 2007/0217912 A1 Sep. 20, 2007

(30) Foreign Application Priority Data

Mar. 14, 2006 (DE) .................. 10 2006 012 008

(51) Int. Cl.
*F15B 13/044* (2006.01)
*F01L 31/00* (2006.01)
*F01B 7/18* (2006.01)
*F15B 13/16* (2006.01)

(52) U.S. Cl. .................. 91/454; 91/274; 91/321; 91/361

(58) Field of Classification Search .............. 91/235, 91/271, 274, 321, 361, 362, 454, 24
See application file for complete search history.

(56) References Cited

U.S. PATENT DOCUMENTS

| | | | | |
|---|---|---|---|---|
| 4,424,674 A | * | 1/1984 | Geier et al. ................. | 91/24 |
| 4,518,011 A | * | 5/1985 | Stoll ........................... | 91/31 |
| 4,590,966 A | * | 5/1986 | Figueroa et al. ............ | 91/449 |
| 4,763,560 A | * | 8/1988 | Sasaki ........................ | 91/361 |
| 5,313,871 A | * | 5/1994 | Kaneko et al. ............. | 91/361 |

FOREIGN PATENT DOCUMENTS

| DE | 203 17 749 | 3/2005 |
|---|---|---|
| WO | 02/086327 | 10/2002 |

* cited by examiner

*Primary Examiner*—Michael Leslie
(74) *Attorney, Agent, or Firm*—Michael J. Striker

(57) ABSTRACT

In an electrohydraulic control unit for rotor blade adjustment of a wind farm via a hydraulic cylinder, the hydraulic cylinder has one piston chamber and one piston rod chamber. Via an inflow valve assembly, a pressure fluid connection can be established between the pump and the piston chamber, while via an outflow valve assembly, a pressure fluid connection can be established between the piston rod chamber and the tank. Each valve assembly has at least two parallel-connected switch valves, which open and can be closed in various combinations in order to establish a desired position of the hydraulic cylinder. This control unit makes precise regulation of the rotor blade possible.

9 Claims, 2 Drawing Sheets

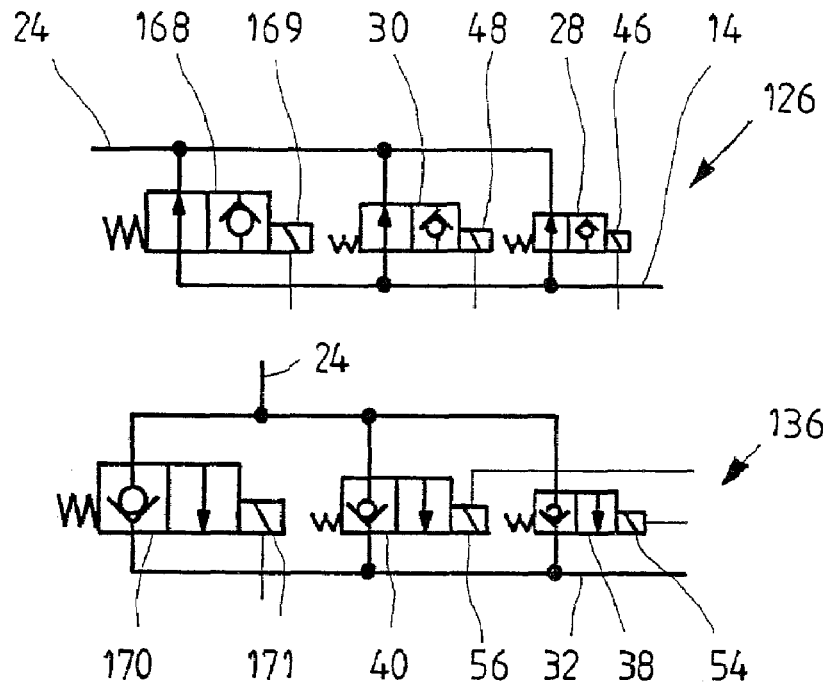
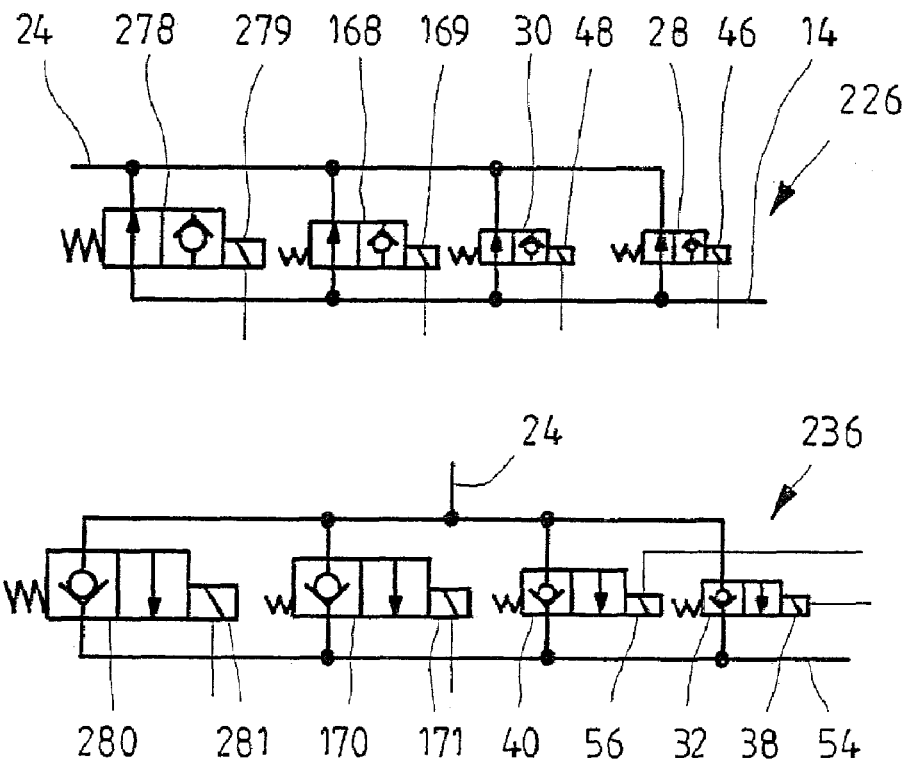
FIG. 2
FIG. 3

US 7,677,154 B2

CONTROL UNIT FOR ROTOR BLADE ADJUSTMENT

CROSS-REFERENCE TO A RELATED APPLICATION

The invention described and claimed hereinbelow is also described in German Patent Application DE 10 2006 012 008.6 filed on Mar. 14, 2006. This German Patent Application, whose subject matter is incorporated here by reference, provides the basis for a claim of priority of invention under 35 U.S.C. 119(a)-(d).

BACKGROUND OF THE INVENTION

The present invention relates to an electrohydraulic control unit for rotor blade adjustment of a wind farm.

One such electrohydraulic control unit is known from German Utility Model DE 203 17 749. In wind farms, rotor blades are adjustable about a rotor blade axis within a predetermined angle range, so that the rotor blade can be positioned into the wind (known as "pitching out") or positioned relative to the wind direction (known as "pitching in"). Since rotor blades are very expensive and vulnerable, and because of the strong forces that prevail especially in a strong wind, a rotor blade adjustment must be made sensitively and without abrupt deceleration or acceleration.

The rotor blade adjustment is done hydraulically via a hydraulic cylinder, with one piston chamber and one piston rod chamber. A pressure line is in constant pressure fluid connection with the piston rod chamber. The piston rod chamber communicates with the piston chamber via a proportional seat valve. The piston chamber can be relieved to a tank via a further proportional seat valve. In this embodiment, if the high degree of fail-safety is to be attained, the additional valves required entail major effort and expense for equipment, and hence complex engineering and high costs.

SUMMARY OF THE INVENTION

The object of the present invention is to create an electrohydraulic control unit with a simple construction, secure bearing regulation, and good fail-safe performance.

In keeping with these objects and with others which will become apparent hereinafter, one feature of the present invention resides, briefly stated, in an electrohydraulic control unit for rotor blade adjustment of a wind farm, comprising a hydraulic cylinder having a piston chamber and a piston rod chamber; an inflow-side valve assembly for establishing a pressure fluid connection between a pump and said piston chamber; an outflow-side valve assembly for establishing a pressure fluid connection between said piston rod chamber and a tank; said inflow valve assembly having at least two parallel-connected switch valves, and said outflow valve assembly having at least two parallel-connected switch valves, and said at least four switch valves being triggerable in different combinations for establishing a desired position of said hydraulic cylinder.

The electrohydraulic control unit of the invention serves to adjust the rotor blades of a wind farm via a hydraulic cylinder. The hydraulic cylinder has one piston chamber and one piston rod chamber. Via an inflow valve assembly, a pressure fluid connection can be established between the pump and the piston chamber, while via an outflow valve assembly, a pressure fluid connection can be established between the piston rod chamber and the tank. Each valve assembly has at least two parallel-connected switch valves with a different maximum flow volume, which are switchable in various combinations in the form of digital hydraulics in order to establish different volumetric flows and to establish a desired position of the hydraulic cylinder and thus the pitch angle.

With this control unit, the requirements made of the control unit, such as precise position regulation and favorable fail-safe performance can be attained economically. Because of the switch valves, a robust, simple construction is possible. The electrohydraulic control unit can also be operated if there is even only one switch valve per valve assembly.

The switch valves are preferably seat valves, because seat valves have leakage-free blockage.

Preferably, the switchable volumetric flow of adjacent switch valves of one valve assembly differs by a factor of 2, so that an incremental increase in the volumetric flow with equal increments is possible. Factors of more than 2 are also possible, as an example.

By means of a pressure fluid connection between the pump upstream of the inflow valve assembly and the piston rod chamber, a regenerative circuit is created by which pressure fluid can be returned from the piston chamber to the piston rod chamber.

In a preferred embodiment, the inflow valve assembly and/or the outflow valve assembly each have three parallel-connected switch valves. The volumetric flow can thus be established in 7 stages and the blocking position (Q=0) represents the eighth position.

In a further embodiment, the inflow valve assembly and/or the outflow valve assembly each have four parallel-connected switch valves. The volumetric flow can thus be established in 15 stages, and the blocking position (Q=0) represents the sixteenth position.

Triggering of the switch valves via a pulse width modulated output current is preferred, so as to optimize the switching time of the valves and the quality of regulation of the axis. A field bus is suitable for pulse width modulation of the switch outputs, since the field bus controller keeps the required hardware and software for the pulse width modulation in readiness.

It is preferable that the field bus be a CAN bus, as a result of which a widely used asynchronous, serial bus system with economical components can be used.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a rotor blade adjuster with an electrohydraulic control unit in the second exemplary embodiment of the present invention; and FIG. 3 shows a rotor blade adjuster with an electrohydraulic control unit in the third exemplary embodiment of the present invention.

DESCRIPTION OF THE PREFERRED EMBODIMENTS

Figure 1:
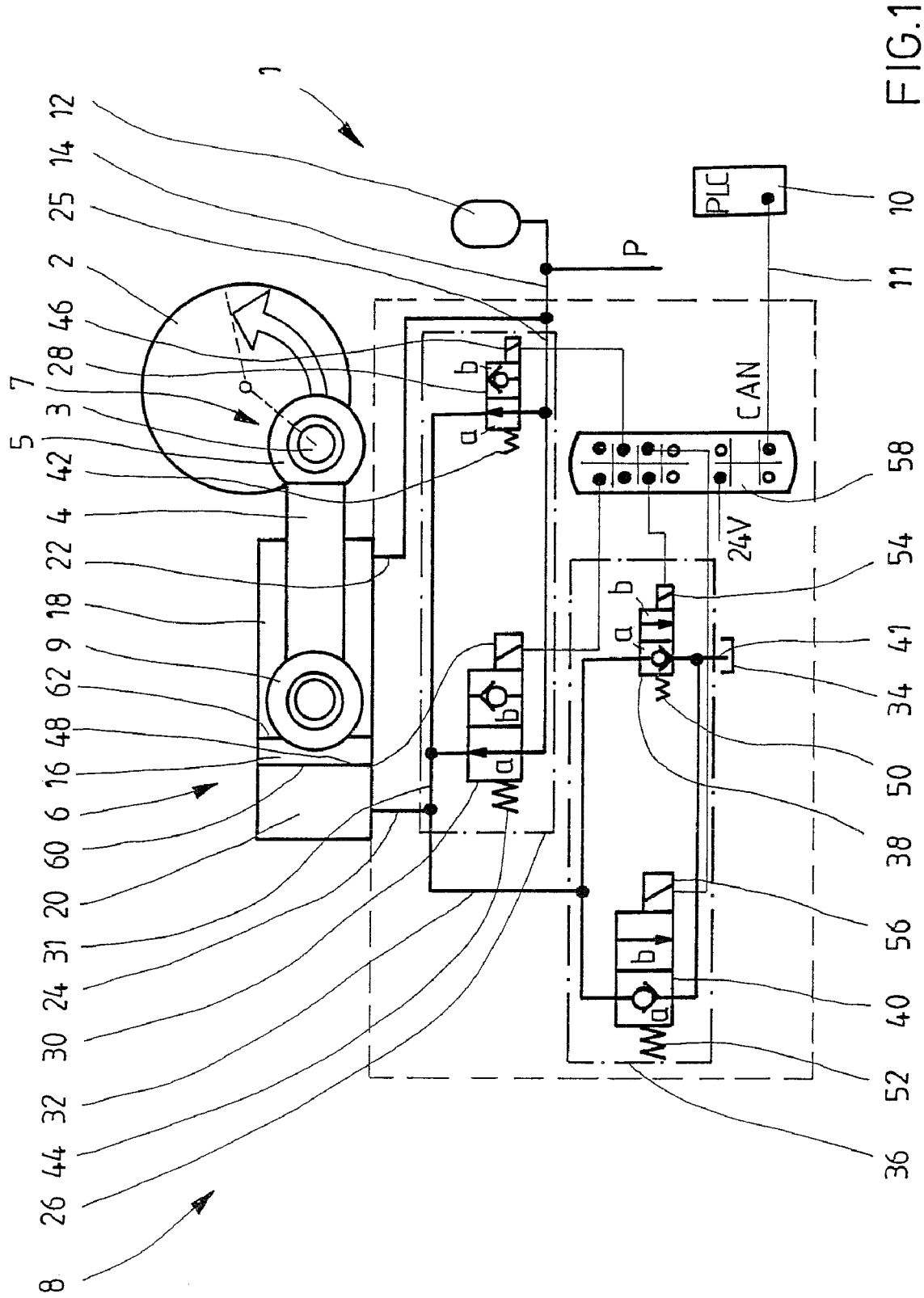
FIG. 1 shows a rotor blade adjuster with an electrohydraulic control unit in the first exemplary embodiment of the present invention.

In the rotor blade adjuster 1 shown in FIG. 1, a pitch angle adjusting member 2 is provided, which acts on a rotor blade, not shown, to adjust its pitch angle. The pitch angle adjusting member 2 is driven by a hydraulic cylinder 6, whose piston rod 4 engages the pitch angle adjusting member 2 and with it forms a crank drive, so that the pitch angle can be adjusted or set by extension and retraction of the piston rod 4.

The hydraulic cylinder 6 is triggered hydraulically via a control unit 8, which is supplied with an electrical control signal from a programmable logic control device (PLC or Programmable Logic Controller) via a field bus. The control unit 8 is also supplied with pressure fluid from a pump, not shown, and a hydraulic reservoir 12 via an inflow line 14.

The hydraulic cylinder 6 has a piston 16, the pivot joint 7 of which is connected to the pitch angle adjusting member 2. The piston 16 divides the hydraulic cylinder into one piston rod chamber 18 and one piston chamber 20 and is supported pivotably via a pivot bearing 9 mounted on the outer circumference. The control unit 8 communicates with the piston rod chamber 18 via a return line 22 and with the piston chamber 20 via a feed line 24.

The construction of the control unit 8 is described below.

The inflow line 14 branches into the return line 22 and a connecting line 25, which leads to the inlets of switch valves 28, 30 of an inflow valve assembly 26. The switch valves 28, 30 of the inflow valve assembly 26 are two parallel-connected 2/2-way switch valves with magnet actuation. Both switch valves 28, 30 are prestressed into their open switching position a via a respective spring 42, 44. Actuation of the respective magnet 46, 48 causes the switch valves 28, 30 to assume their closed switching positions b. The switch valve 28 of the inflow valve assembly 26 has a low maximum flow volume, while the switch valve 30 of the inflow valve assembly 26 has a high maximum flow volume (greater rated width). The outlet of the parallel-connected switch valves 28, 30 is connected via a work line 31 to the feed line 24 leading toward the piston chamber 20 of the hydraulic cylinder 6.

From the feed line 24, an outflow line 32 branches off and leads to the inlets of two switch valves 38, 40 of an outflow valve assembly 36. The switch valves 38, 40 of the outflow valve assembly 36 are likewise 2/2-way switch valves, which are prestressed by an associated spring 50, 52, respectively, into the closed switching position a. By actuation of the respective magnets 54, 56, the switch valves 38, 40 reach their open switching positions b. The switch valve 38 of the outflow valve assembly 36 has a low maximum flow volume, while the switch valve 40 of the outflow valve assembly 36 has a high maximum flow volume (greater rated width). The outlet of the parallel-connected switch valves 38, 40 leads to the tank 34 via a tank line 41.

The magnets 46, 48 of the inflow valve assembly 26 and the magnets 54, 56 of the outflow valve assembly 36 are in electrical communication with a magnet controller 58, to which electrical signals from the programmable logic control devices 10 can be delivered via the field bus 11.

The function of the electrohydraulic control unit 8 will now be explained in terms of the first exemplary embodiment, referring to FIG. 1.

The fundamental principle of digital hydraulics is described in International Patent Application WO 02/086327 A1.

The inflow valve assembly 26 and the outflow valve assembly 36 each represent one element of a digital hydraulic unit. The maximum flow volumes of the switch valves 28, 30 of the inflow valve assembly, for a defined pressure difference via the respective valve, differ by a factor of 2. The result, for appropriate triggering of the switch valves 28, 30, is a volumetric flow stage as shown in Table 1 below.

| Position of Switch Valve 28 | Position of Switch | Volumetric Flow* Valve 30 |
|---|---|---|
| b | b | 0 |
| b | a | 1 |
| a | b | 2 |
| a | a | 3 |

*standardized for the maximum flow through the smallest valve

In the case of the switch valves 38, 40 of the outflow valve assembly 36 as well, this ratio of 1 to 2 in the maximum flow volumes, for a defined pressure difference via the valve, also exists, so that corresponding volumetric flows to the tank 4 can be established.

The mode of operation of the rotor blade adjuster 1 of FIG. 1 will now be described. It will be assumed that with the piston 16 retracted, the rotor blades are positioned relative to the wind direction, or in other words are positioned in the wind, while with the piston 16 extended, the rotor blades are positioned out of the wind ("flag position").

In the basic position, the magnets 46, 48 of the switch valves 28, 30 of the inflow valve assembly 26 have current flowing through them, so that the switch valves 28, 30 are put into their closed switching position b. The magnets 54, 56 of the switch valves 38, 40 of the outflow valve assembly 36 have no current flowing through them, so that the switch valves 38, 40 are put in their closed switching position a. The pump pressure prevails in the piston rod chamber 18, via the inflow line 14 and the return line 22. In this basic position, the hydraulic cylinder 6 is hydraulically blocked and fixed in accordance with the pitch angle.

If an extension of the hydraulic cylinder 6 is desired, to put the rotor blade out of the wind, then current is supplied to the magnets 46, 48 of the switch valves 28, 30, so as to put at least one of the switch valves 28, 30 into the open switching position a. The manner in which current is supplied to the switch valves 28, 30 depends on the desired volumetric flow that is to be supplied from the inflow line 14 to the feed line 24, as shown in Table 1 above. The extension of the hydraulic cylinder 6 is accomplished because of the pressure fluid connection between the piston rod chamber 18 and the piston chamber 20 and because of the difference in area between the cylindrical face 60 on the piston 16, pointing toward the piston chamber 20, and the annular face 62 on the piston 16, pointing toward the piston rod chamber 18.

If from one of the extended positions of the piston 16 a retraction of the hydraulic cylinder 6 is desired, the switch valves 28, 30, via a suitable supply of current to the magnets 46, 48, are left in their basic position b, in which the pressure fluid connection between the inflow line 14 and the feed line 24 is blocked off. In the piston rod chamber 18, the pressure prevails in the inflow line 14 or in the hydraulic reservoir 12. The magnets 54, 56 of the switch valves 38, 40 are supplied with current to suit the desired retraction performance, so that a pressure fluid connection opens between the outflow line 32 and the tank line 41, and pressure fluid can flow out of the piston chamber 20 to the tank 34.

Once the desired position of the piston 16 is reached, both after a retraction motion and after an extension motion, the switch valves of the inflow valve assembly 26 and the outflow valve assembly 36 are put in their basic position; that is, the switch valves 28, 30 are put in the switching position b and the switch valves 38, 40 are put in the switching position a. The piston chamber is thus hydraulically blocked, so that the motion of the piston 16 in the hydraulic cylinder 6 can be stopped.

The electrical triggering of the magnets 46, 48 of the inflow valve assembly 26 and of the magnets 54, 56 of the outflow valve assembly 36 is effected via a magnet controller, which receives signals from the programmable logic control device 10 via a field bus 11, preferably a CAN bus. Pulse width modulated triggering is preferred.

Not only the pitch angle adjusting member 2 but the piston rod 4, hydraulic cylinder 6, reservoir 12, and electrohydraulic control unit 8 are preferably located in the rotor of the wind farm; all that is needed is to supply the pump pressure P to the rotor and to withdraw pressure fluid via the outflow line 32 to the tank 34. Either the magnet controller 58 can be located in the rotor of the wind farm, or the control signals to the magnets 46, 48, 54, 56 are delivered from a magnet controller in the tower rotation gondola outside the rotor 5.

Because the basic position of the switch valve 28, 30 is the closed switching position b, it is assured that if the electrical power fails, the switch valves 28, 30 will be put with the aid of the springs 42, 44 into the opened switching position a, in which a pressure fluid connection is opened between the inflow line 14 and the feed line 24. The switch valves 38, 40 are in the switching position a, so that the pressure fluid cannot flow out of the piston chamber 20 to the tank 34. By a delivery of pressure fluid from the hydraulic reservoir 12 to the piston chamber 20, an extension of the piston 16 is effected, and thus a rotation out of the wind ("flag position"). Good fail-safe performance can thus be assured.

FIG. 2 shows an inflow valve assembly 126 and an outflow valve assembly 136 of an electrohydraulic control unit in the second exemplary embodiment. Except for these valve assemblies 126, 136, the electrohydraulic control unit of the second exemplary embodiment corresponds to that of the first exemplary embodiment, so that the structure in FIG. 1 can be referred to.

Unlike the inflow valve assembly 26 of the first exemplary embodiment, the inflow valve assembly 126 of the second exemplary embodiment, in addition to the switch valves 28 and 30, has a switch valve 161, parallel to them, that is connected to the magnet controller 58 via a magnet 169. The maximum flow volume that can be switched by the switch valve 168 at a predetermined pressure difference via the valve is shown in Table 2 below:

| Position of Switch Valve 168 | Position of Switch Valve 30 | Position of Switch Valve 28 | Volumetric Flow* |
|---|---|---|---|
| b | b | b | 0 |
| b | b | a | 1 |
| b | a | b | 2 |
| b | a | a | 3 |
| a | b | b | 4 |
| a | b | a | 5 |
| a | a | b | 6 |
| a | a | a | 7 |

*standardized for the maximum flow through the smallest valve

As can be seen from this table, as a function of which valve 28, 30, 168 is switched, a maximum flow volume in the range from stage 0 to 7, standardized for the maximum flow through the smallest valve, can be attained with an increase by one stage at a time.

In the case of the outflow valve assembly 136 of the second exemplary embodiment, again in addition to the switch valves 38, 40, there is a parallel-connected switch valve 170, which is triggerable by the magnet controller 58 via a magnet 171. The maximum switchable flow volume in the second exemplary embodiment is equivalent to the volumetric flow, shown in the above table, of the inflow valve assembly 126, but the two switching positions a and b are transposed.

With the electrohydraulic control unit of the second exemplary embodiment, more-sensitive pitch angle adjustment as a result of the extension motion and retraction motion of the piston 16 is possible.

FIG. 3 shows an electrohydraulic control unit in the third exemplary embodiment, in which an inflow valve assembly 226, in addition to the switch valves 28, 30 and 168 of the second exemplary embodiment, has a further parallel-connected switch valve 278, and the outflow valve assembly 236, in addition to the switch valves 38, 40 of the outflow valve assembly 136 of the second exemplary embodiment, has one parallel-connected switch valve 280. The switch valves 278, 280 are each actuated by a respective magnet 279, 281.

The switch valve 278 and the switch valve 280 are preferably designed in such a way that at a predetermined pressure difference via the respective valve, a maximum flow volume in accordance with Table 3 below can be switched:

| Valve 170 | Valve 168 | Valve 30 | Valve 28 | Volumetric Flow |
|---|---|---|---|---|
| b | b | b | b | 0 |
| b | b | b | a | 1 |
| b | b | a | b | 2 |
| b | b | a | a | 3 |
| b | a | b | b | 4 |
| b | a | b | a | 5 |
| b | a | a | b | 6 |
| b | a | a | a | 7 |
| a | b | b | b | 8 |
| a | b | b | a | 9 |
| a | b | a | b | 10 |
| a | b | a | a | 11 |
| a | a | b | b | 12 |
| a | a | b | a | 13 |
| a | a | a | b | 14 |
| a | a | a | a | 15 |

The switch valves 168 and 278 of the inflow valve assemblies 126, 226, respectively, are prestressed into the opening position by means of an associated spring. Also in the same way as the switch valves 28, 30, in the basic position the switch valves 168, 278 are switched to the closed position by the magnets 169, 279.

In the same way as the switch valves 38, 40 of the outflow valve assembly 136, 236, the switch valves 170, 280 in the basic position are prestressed to the closed position by an associated spring.

The number of switch valves in the valve assemblies is not limited to 2, 3 or 4 as in the first through third exemplary embodiments; instead, an arbitrary number of further switch valves can be added to the respective valve assembly for the sake of providing a finer graduation of the volumetric flow in the inflow and the outflow. With regard to the digital hydraulic unit, see the circuits in International Patent Application WO 02/086327 A1.

The number of switch valves in the inflow valve assembly need not be the same as the number of switch valves in the outflow valve assembly, either. Instead, an arbitrary number of switch valves may be provided in each valve assembly, as long as their number amounts to at least two switch valves per valve assembly. In this way, desired differences in the graduation of the volumetric flows in the inflow and in the outflow can be provided for.

With the electrohydraulic control units of the second and third exemplary embodiments, precise position regulation of the rotor blade can be accomplished economically with good fail-safe performance.

The invention relates to an electrohydraulic control unit for rotor blade adjustment of a wind farm via a hydraulic cylinder. The hydraulic cylinder has one piston chamber and one piston rod chamber. Via an inflow valve assembly, a pressure fluid connection can be established between the pump and the piston chamber, while via an outflow valve assembly, a pressure fluid connection can be established between the piston rod chamber and the tank. Each valve assembly has at least two parallel-connected switch valves, which open and can be closed in various combinations in order to establish a desired position of the hydraulic cylinder. This control unit makes precise regulation of the rotor blade possible.

It will be understood that each of the elements described above, or two or more together, may also find a useful application in other types of constructions differing from the type described above.

While the invention has been illustrated and described as embodied in a control unit for rotor blade adjustment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An electrohydraulic control unit for rotor blade adjustment of a wind farm, comprising:
   a hydraulic cylinder having a piston chamber and a piston rod chamber;
   an inflow-side valve assembly for establishing a pressure fluid connection between a pump and said piston chamber;
   an outflow-side valve assembly for establishing a pressure fluid connection between said piston chamber and a tank, said inflow valve assembly having at least two parallel-connected switch valves, and said outflow valve assembly having at least two parallel-connected switch valves, and said at least four switch valves being triggerable in different combinations for establishing a desired position of said hydraulic cylinder, wherein said piston rod chamber is in permanent pressure fluid connection with the pump or a pressure fluid reservoir upstream of said inflow valve assembly,
   wherein said switch valves of said inflow valve assembly are prestressed by respective first springs to an open switching position, and
   wherein said switch valves of said outflow valve assembly are prestressed by respective second springs to a closed switching position.

2. An electrohydraulic control unit as defined in claim 1, wherein said at least two parallel-connected switch valves of said inflow assembly have a different maximum flow volume, while said at least two parallel-connected switch valves of said outflow valve assembly have a different maximum flow volume as well.

3. An electrohydraulic control unit as defined in claim 1, wherein said switch valves are electrically actuated seat valves.

4. An electrohydraulic control unit as defined in claim 2, wherein said switch valves are configured so that the maximum flow volume of said switch valves associated with an inflow and an outflow, respectively, differ.

5. An electrohydraulic control unit as defined in claim 4, wherein said maximum flow volumes of said switch valves associated with the inflow and the outflow differ by a factor of 2.

6. An electrohydraulic control unit as defined in claim 1, wherein said inflow valve assembly has three parallel-connected switch valves, and said outflow valve assembly has three parallel-connected switch valves, wherein maximum flow values of the respective ones of respective three parallel-connected switch valves have a ratio 4:2:1.

7. An electrohydraulic control unit as defined in claim 1, wherein said inflow valve assembly has four parallel-connected switch valves and said outflow valve assembly has four parallel-connected switch valves and maximum flow volumes of respective four parallel-connected switch valves have a ratio of 8:4:2:1.

8. An electrohydraulic control unit as defined in claim 1; and further comprising a field bus, said switch valves being triggerable by said field bus via a pulse width modulated current.

9. An electrohydraulic control unit as defined in claim 8, wherein said field bus is configured as a CAN bus.

* * * * *